United States Patent
Cimpeanu et al.

(10) Patent No.: US 9,404,023 B2
(45) Date of Patent: Aug. 2, 2016

(54) PRESSURE-SENSITIVE ADHESIVE FOR PVC FOILS

(75) Inventors: Carmen-Elena Cimpeanu, Ludwigshafen (DE); Cornelis Petrus Beyers, Altrip (DE); Andree Dragon, Speyer (DE)

(73) Assignee: BASF SE, Ludwigshafen (DE)

( * ) Notice: Subject to any disclaimer, the term of this patent is extended or adjusted under 35 U.S.C. 154(b) by 130 days.

(21) Appl. No.: 13/514,773

(22) PCT Filed: Dec. 6, 2010

(86) PCT No.: PCT/EP2010/068945
§ 371 (c)(1),
(2), (4) Date: Jun. 8, 2012

(87) PCT Pub. No.: WO2011/069950
PCT Pub. Date: Jun. 16, 2011

(65) Prior Publication Data
US 2012/0244350 A1  Sep. 27, 2012

(30) Foreign Application Priority Data

Dec. 9, 2009  (EP) .................................... 09178445

(51) Int. Cl.
| | |
|---|---|
| C09J 133/08 | (2006.01) |
| C09J 133/10 | (2006.01) |
| C09J 133/20 | (2006.01) |
| C09J 133/12 | (2006.01) |
| C08F 2/00 | (2006.01) |
| C09J 7/02 | (2006.01) |

(52) U.S. Cl.
CPC ............. *C09J 133/08* (2013.01); *C08F 2/001* (2013.01); *C09J 133/12* (2013.01); *C09J 133/20* (2013.01); *C09J 7/0217* (2013.01); *C09J 7/0278* (2013.01); *C09J 2201/606* (2013.01); *C09J 2433/00* (2013.01); *Y10T 428/2887* (2015.01)

(58) Field of Classification Search
None
See application file for complete search history.

(56) References Cited

U.S. PATENT DOCUMENTS

| | | | | |
|---|---|---|---|---|
| 3,454,516 A | * | 7/1969 | Claus ............................ | 524/522 |
| 5,302,629 A | * | 4/1994 | Berejka ........................ | 523/111 |
| 5,567,773 A | * | 10/1996 | McGee ................. | C09J 7/0217 |
| | | | | 428/515 |
| 5,869,569 A | * | 2/1999 | Arai et al. ..................... | 524/823 |
| 5,895,801 A | * | 4/1999 | Lee ............................... | 525/301 |
| 6,605,662 B2 | * | 8/2003 | Zhao et al. .................... | 524/458 |
| 7,070,051 B2 | * | 7/2006 | Kanner et al. ................ | 206/382 |
| 2001/0019766 A1 | * | 9/2001 | Masuda et al. ................ | 428/345 |
| 2003/0113460 A1 | | 6/2003 | Even et al. | |
| 2007/0187033 A1 | * | 8/2007 | Schumacher et al. ........ | 156/332 |
| 2007/0276096 A1 | * | 11/2007 | Wefer et al. ................... | 525/298 |
| 2009/0111929 A1 | * | 4/2009 | Beyers et al. ................. | 524/457 |

FOREIGN PATENT DOCUMENTS

| | | |
|---|---|---|
| DE | 199 29 561 | 12/2000 |
| EP | 0 219 796 | 4/1987 |
| EP | 0 454 426 | 10/1991 |
| EP | 0 978 551 | 2/2000 |
| EP | 1 378 527 | 1/2004 |
| EP | 1 520 898 | 4/2005 |
| WO | 93 14161 | 7/1993 |
| WO | 2005 100501 | 10/2005 |
| WO | 2005 100502 | 10/2005 |

OTHER PUBLICATIONS

Polymer Data Sheet (2013).*
Aldrich Data Sheet (2013).*
International Search Report Issued Jan. 31, 2011 in PCT/EP10/68945 Filed Dec. 6, 2010.
U.S. Appl. No. 14/356,530, filed May 6, 2014, Seyffer, et al.
U.S. Appl. No. 14/360,803, filed May 27, 2014, Seyffer, et al.

* cited by examiner

*Primary Examiner* — Frank D Ducheneaux
(74) *Attorney, Agent, or Firm* — Oblon, McClelland, Maier & Neustadt, L.L.P.

(57) ABSTRACT

An adhesive is described, in particular for applications on substrate materials made of flexible PVC, comprising a polymer which is obtainable via free-radical polymerization of ethylenically unsaturated compounds and which is composed of at least 50% by weight of soft acrylate monomers with glass transition temperature below 0° C., at least 1% by weight of ethylenically unsaturated nitriles, at least 1% by weight of hard acrylate monomers with glass transition temperature of at least 60° C., at least 0.1% by weight of ethylenically unsaturated acid monomers, and at least 0.01% by weight of monomers having at least two non-conjugated, polymerizable vinyl groups, where the polymerization reaction takes place via staged polymerization, and at least one portion of the soft acrylate monomers is polymerized in a first polymerization stage, and at least one portion of the hard acrylate monomers is polymerized in a second or subsequent polymerization stage. Uses of the adhesive for the bonding of substrates made of flexible PVC are also described, as also are self-adhesive items with a PVC foil as substrate material and with a coating of the adhesive of the invention.

20 Claims, No Drawings

PRESSURE-SENSITIVE ADHESIVE FOR PVC FOILS

BACKGROUND OF THE INVENTION

Field of the Invention

The invention relates to an adhesive, in particular for applications on substrate materials made of flexible PVC, comprising a polymer which is obtainable via free-radical polymerization of ethylenically unsaturated compounds and which is composed of certain amounts of soft acrylate monomers with glass transition temperature below 0° C., ethylenically unsaturated nitriles, hard acrylate monomers with glass transition temperature of at least 60° C., ethylenically unsaturated acid monomers and monomers having at least two non-conjugated, polymerizable vinyl groups, where the polymerization reaction takes place via staged polymerization, and at least one portion of the soft acrylate monomers is polymerized in a first polymerization stage, and at least one portion of the hard acrylate monomers is polymerized in a second or subsequent polymerization stage. Uses of the adhesive for the bonding of substrates made of flexible PVC are also described, as also are self-adhesive items with a PVC foil as substrate material and with a coating of the adhesive of the invention.

Outdoor and indoor applications, in particular those known as Graphic Arts applications, often use self-adhesive labels and tapes, and also printed foils with flexible PVC as substrate material. Flexible PVC foils comprise considerable amounts of low-molecular-weight plasticizers based on phthalate, or polymeric plasticizers. A problem arising from the use of said plasticizers is that the plasticizer can migrate from the foil into the pressure-sensitive adhesive. The result is impairment of the performance characteristics of the adhesive. Migration of the plasticizer into the adhesive generally causes a marked reduction of the cohesion of the adhesive and also of the adhesion of the adhesive to the surface to which the label or foil is adhesive-bonded. This problem is exacerbated when precoated, self-adhesive flexible PVC foils are stored for a prolonged period, in particular also at relatively high temperatures, before they are used.

The self-adhesive items are also exposed to the effect of moisture, both outdoors and indoors. Exposure of the adhesive film to water leads to undesired white haze, the term used being whitening.

In the case of self-adhesive items with polymer foils, in particular flexible PVC, as substrate material, shrinkage of the foil frequently occurs during subsequent use. Shrinkage is particularly observed when the self-adhesive items have exposure to elevated temperatures during use. It is therefore desirable to find adhesives which give self-adhesive items with improved shrinkage behavior.

WO 2005/100501 describes pressure-sensitive adhesives for PVC foils. The pressure-sensitive adhesives comprise a polymer which is obtainable via free-radical polymerization of ethylenically unsaturated compounds, and which is composed of at least 60% by weight of main monomers selected from, inter alia, C1-C20-alkyl (meth)acrylates, and also more than 1% by weight of monomers having at least two non-conjugated, polymerizable vinyl groups. Adhesives for producing self-adhesive items with flexible PVC as substrate material are also described in EP 1378527, EP 1520898, EP 454426, EP 978551, and WO 93/14161.

Further optimization in respect of the three quality requirements relating to storage stability, whitening behavior and shrinkage behavior is not a trivial matter, because an improvement in one criterion is often attended by impairment of at least one of the other criteria.

Objects of the present invention were therefore to provide adhesives for self-adhesive items with minimum shrinkage and maximum water resistance (whitening), and maximum shelf-life, in particular at relatively high temperatures. The adhesives are intended moreover to have good adhesion and cohesion, and also to have good processability.

BRIEF SUMMARY OF THE INVENTION

Accordingly, the adhesives defined in more detail below, and the use of the same, have been found. The invention provides an adhesive, comprising a polymer which is obtainable via free-radical polymerization of ethylenically unsaturated compounds and which is composed of
(a) at least 50% by weight of at least one soft acrylate monomer selected from alkyl acrylates which when polymerized in the form of homopolymer have a glass transition temperature below 0° C.,
(b) at least 1% by weight of at least one ethylenically unsaturated nitrile,
(c) at least 1% by weight of at least one hard acrylate monomer selected from alkyl acrylates and alkyl methacrylates which, respectively, when polymerized in the form of homopolymer have a glass transition temperature of at least 60° C.,
(d) at least 0.1% by weight of at least one ethylenically unsaturated acid monomer,
(e) at least 0.01% by weight of at least one monomer having at least two non-conjugated, polymerizable vinyl groups, and
(f) optionally other monomers different from the monomers (a) to (e),
where the polymerization reaction takes place via staged polymerization, where at least one portion of the soft acrylate monomers (a) is polymerized in a first polymerization stage and at least one portion of the hard acrylate monomers (c) is polymerized in a second or subsequent polymerization stage. Glass transition temperature can be determined by differential scanning calorimetry (ASTM D3418-08, "midpoint temperature").

DETAILED DESCRIPTION OF THE INVENTION

The adhesive of the invention comprises the polymer defined above. The polymer is obtainable via free-radical polymerization of ethylenically unsaturated compounds (monomers). The polymer is composed of at least 50% by weight, preferably at least 55% by weight, particularly preferably from 55 to 90% by weight, of at least one soft acrylate monomer selected from alkyl acrylates which when polymerized in the form of homopolymer have a glass transition temperature below 0° C., preferably below −10° C. or below −20° C., particularly preferably below −30° C.

Examples of soft acrylate monomers (a) are alkyl acrylates having a $C_2$-$C_{10}$-alkyl radical. Examples that may be mentioned are ethyl acrylate, n-propyl acrylate, isobutyl acrylate, sec-butyl acrylate, tert-butyl acrylate, n-butyl acrylate, n-hexyl acrylate, and 2-ethylhexyl acrylate. Particular preference is given to n-butyl acrylate and 2-ethylhexyl acrylate and to a mixture of these.

The amount of ethylenically unsaturated nitriles (b) used is at least 1% by weight, preferably from 1 to 15% by weight or from 2 to 10% by weight. Particular preference is given to acrylonitrile, methacrylonitrile, and a mixture of these.

The amount used of the hard acrylate monomers (c) is at least 1% by weight, preferably from 1 to 30% by weight. Examples of hard acrylate monomers (c) are alkyl acrylates and alkyl methacrylates having respectively from 1 to 10 carbon atoms in the alkyl group, as long as the glass transition temperature of the respective homopolymer is at least 60° C., particularly preferably at least 80° C. Preference is given to alkyl methacrylates having from 1 to 4 carbon atoms in the alkyl group. Examples of hard acrylatemonomers (c) are methyl methacrylate, ethyl methacrylate, isobutyl methacrylate, or tert-butyl methacrylate. Particular preference is given to methyl methacrylate.

The amount used of the ethylenically unsaturated acid monomers (d) is at least 0.1% by weight, preferably from 0.1 to 10% by weight, or from 0.5 to 8% by weight, or from 1 to 6% by weight. Examples of monomers of the group (d) are ethylenically unsaturated carboxylic acids, ethylenically unsaturated sulfonic acids, and vinylphosphonic acid. The ethylenically unsaturated carboxylic acids used preferably comprise alpha, beta-monoethylenically unsaturated mono- and dicarboxylic acids having from 3 to 6 carbon atoms in the molecule. Example of these are acrylic acid, methacrylic acid, itaconic acid, maleic acid, fumaric acid, crotonic acid, vinylacetic acid, and vinyllactic acid. Examples of suitable ethylenically unsaturated sulfonic acids are vinylsulfonic acid, styrenesulfonic acid, acrylamidomethylpropanesulfonic acid, sulfopropyl acrylate, and sulfopropyl methacrylate. Preference is given to acrylic acid and methacrylic acid, and a mixture of these, and particular preference is given to acrylic acid. The form in which the monomers of group (d) comprising acid groups are used in the polymerization reaction can be that of the free acids, or else a form partially or completely neutralized by suitable bases. It is preferable to use sodium hydroxide solution, potassium hydroxide solution, or ammonia as neutralizing agent.

The amounts used of the monomers (e) having at least two non-conjugated, polymerizable vinyl groups (internal crosslinking agents) is at least 0.01% by weight, preferably from 0.01 to 0.5% by weight or from 0.05 to 0.1% by weight. Preferred vinyl groups are acrylic or methacrylic groups. Examples that may be mentioned are divinyl benzene, alkanediol diacrylates, alkanediol dimethacrylates, allyl acrylates, and allyl methacrylates. Particular preference is given to alkanediol diacrylates and alkanediol dimethacrylates having respectively from 2 to 8, preferably from 4 to 6, carbon atoms in the alkanediol group. Very particular preference is given to allyl methacrylate, butanediol diacrylate, butanediol dimethacrylate, hexanediol diacrylate, and hexanediol dimethacrylate, or a mixture of these.

The polymer comprised in the adhesive of the invention can optionally be composed of other monomers (f) that differ from the monomers (a) to (e). The amounts present of the further monomers (f) can be from 0 to 25% by weight, e.g. from 0.5 to 25% by weight. In one preferred embodiment, the polymer is composed of at least 0.5% by weight, in particular from 0.5 to 15% by weight, or from 1 to 10% by weight, of at least one hydroxy monomer (f1) selected from hydroxyalkyl acrylates and hydroxyalkyl methacrylates having respectively from 1 to 10 carbon atoms in the alkyl groups, and also from 0 to 15% by weight of other monomers (f2) different from the monomers (a) to (f1). Preferred hydroxy monomers (f1) are 2-hydroxypropyl acrylate and 2-hydroxybutyl acrylate. One particular embodiment of the invention comprises a mixture of 2-hydroxypropyl acrylate and 2-hydroxybutyl acrylate.

Examples of other monomers (f2) are selected from (meth)acrylates different from (a) and (c), e.g. methyl acrylate, vinyl esters of carboxylic acids comprising up to 20 carbon atoms, vinylaromatics having up to 20 carbon atoms, vinyl halides, vinyl ethers of alcohols comprising from 1 to 10 carbon atoms, hydrocarbons having from 4 to 8 carbon atoms and having one or two conjugated olefinic double bonds, acrylamide, methacrylamide, phenyloxyethyl glycol mono(meth)acrylate, glycidyl acrylate, glycidyl methacrylate, and amino (meth)acrylates, such as 2-aminoethyl (meth)acrylate. Examples of vinyl esters of carboxylic acids having from 1 to 20 carbon atoms are vinyl laurate, vinyl stearate, vinyl propionate, vinyl versatate, and vinyl acetate. Vinlyaromatic compounds that can be used are vinyltoluene, alpha- and para-methylstyrene, alpha-butylstyrene, 4-n-butylstyrene, 4-n-decylstyrene, and preferably styrene. The vinyl halides are chlorine-, fluorine- or bromine-substituted ethylenically unsaturated compounds, preferably vinyl chloride and vinylidine chloride. Examples that may be mentioned of vinyl ethers are vinyl methyl ether and vinyl isobutyl ether. Preference is given to a vinyl ether of alcohols comprising from 1 to 4 carbon atoms. Hydrocarbons that may be mentioned having from 4 to 8 carbon atoms and having one or two conjugated olefinic double bonds are ethylene, propylene, butadiene, isoprene, and chloroprene. Preferred other monomers are vinyl aromatics, in particular styrene.

The polymer preferably comprises hydrophilic groups selected from carboxy groups, hydroxy groups, amino groups, and carboxamide groups. The content of said hydrophilic groups is in particular from 0.001 to 0.5 mol for every 100 g of polymer. The content is preferably at least 0.005 mol, particularly preferably at least 0.008 mol, and at most 0.2 mol, in particular at most 0.1 mol, very particularly preferably at most 0.05 or 0.03 mol, for every 100 g of polymer. It is particularly preferable that the hydrophilic groups have been selected from carboxy groups, hydroxy groups, and carboxamide groups. It is particularly preferable that at least 20 mol % of the total molar amount of said hydrophilic groups are carboxy groups. Carboxy groups are not only carboxylic acid groups but also salts of these. In the case of the salts, these are preferably salts with volatile bases, e.g. ammonia. The hydrophilic groups can be bonded to the polymer via copolymerization of the corresponding monomers. Preferred monomers having hydrophilic groups are the abovementioned monomers having carboxy groups and hydroxy groups, in particular, for example, acrylic acid.

One embodiment of the invention is characterized in that the soft acrylate monomers (a) have been selected from n-butyl acrylate and 2-ethylhexyl acrylate, the monomer (b) is acrylonitrile, the hard acrylate monomer (c) is methyl methacrylate, the acid monomers (d) have been selected from acrylic acid and methacrylic acid, and the monomers (e) have been selected from alkanediol diacrylates, alkanediol dimethacrylates, allyl acrylates, and allyl methacrylates.

One embodiment of the invention is characterized in that the amounts present of the monomers (a) are from 55 to 90% by weight, the amounts present of the monomers (b) are from 1 to 15% by weight, the amounts present of the monomers (c) are from 1 to 30% by weight, the amounts present of the monomers (d) are from 0.1 to 10% by weight, the amounts present of the monomers (e) are from 0.05 to 0.5% by weight, and the amounts present of the monomers (f) are from 0.5 to 25% by weight.

One preferred embodiment of the invention is characterized in that the polymer is composed of
(a) from 55 to 90% by weight of at least one soft acrylate monomer selected from n-butyl acrylate and 2-ethylhexyl acrylate,
(b) from 2 to 10% by weight of acrylonitrile, (c) from 1 to 30% by weight of methyl methacrylate, where from 1 to 15% by weight, based on the total amount of all of the monomers, are polymerized in a second polymerization stage, (d) from 0.2 to 5% by weight of at least one acid monomer selected from acrylic acid and methacrylic acid.

(e) from 0.05 to 0.5% by weight of at least one monomer having at least two non-conjugated, polymerizable vinyl groups, (f1) from 0.5 to 10% by weight of at least one hydroxymonomer selected from hydroxyalkyl acrylates and hydroxyalkyl methacrylates having respectively from 1 to 10 carbon atoms in the alkyl groups, and (f2) from 0 to 15% by weight of other monomers different from the monomers (a) to (f1).

The polymer comprised in the adhesive of the invention is preferably free from vinyl acetate, while the adhesive comprises no crosslinking agents other than the internal crosslinking agents (e), and in particular no external crosslinking agents.

In one preferred embodiment, the polymers are produced via emulsion polymerization, the material therefore being an emulsion polymer. The emulsion polymerization reaction uses ionic and/or nonionic emulsifiers and/or protective colloids and, respectively, stabilizers as surfactant compounds. Houben-Weyl, Methoden der organischen Chemie [Methods of organic chemistry], volume XIV/1, Makromolekulare Stoffe [Macromolecular substances], Georg Thieme Verlag, Stuttgart, 1961, pp. 411 to 420 provides a detailed description of suitable protective colloids. Emulsifiers that can be used are not only anionic and cationic but also nonionic emulsifiers. The ancillary surfactant substances used preferably comprise exclusively emulsifiers of molar mass usually below 2000 g/mol, thus differing from the protective colloids. If mixtures of surfactant substances are used, the individual components must, of course, be mutually compatible, and in case of doubt this can be checked by using a few preliminary experiments. It is preferable that anionic and nonionic emulsifiers are used as surfactant substances. Examples of familiar ancillary emulsifiers are ethoxylated fatty alcohols (EO level: from 3 to 50, alkyl radical: $C_8$ to $C_{36}$), ethoxylated mono-, di- and trialkylphenols (EO level: from 3 to 50, alkyl radical: $C_4$ to $C_9$), alkali metal salts of dialkyl esters of sulfosuccinic acid, and also the alkali metal and ammonium salts of alkyl sulfates (alkyl radical: $C_8$ to $C_{12}$), of ethoxylated alkanols (EO level: from 4 to 30, alkyl radical: $C_{12}$ to $C_{18}$), of ethoxylated alkylphenols (EO level: from 3 to 50, alkyl radical: $C_4$ to $C_9$), of alkylsulfonic acids (alkyl radical: $C_{12}$ to $C_{18}$), and of alkylarylsulfonic acids (akyl radical $C_9$ to $C_{18}$).

Other suitable emulsifiers are compounds of the general formula I

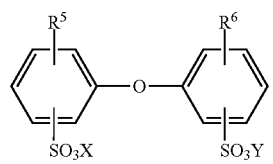

(I)

in which $R^5$ and $R^6$ are hydrogen or $C_4$ to $C_{14}$-alkyl and are not simultaneously hydrogen, and X and Y can be alkali metal ions and/or ammonium ions. It is preferable that $R^5$ and $R^6$ are linear or branched alkyl radicals having from 6 to 18 carbon atoms, or hydrogen, and in particular those having 6, 12, and 16 carbon atoms, where $R^5$ and $R^6$ are not both simultaneously hydrogen. X and Y are preferably sodium, potassium or ammonium ions, particular preference being given to sodium. Particularly advantageous compounds II are those in which X and Y are sodium, $R^5$ is a branched alkyl radical having 12 carbon atoms, and $R^6$ is hydrogen or $R^5$. Industrial mixtures are often used having a proportion of from 50 to 90% by weight of the monoalkylated product, an example being Dowfax®2A1 (trademark of Dow Chemical Company).

Houben-Weyl, Methoden der organischen Chemie [Methods of organic chemistry], volume 14/1, Makromolekulare Stoffe [Macromolecular substances], Georg Thieme Verlag, Stuttgart, 1961, pp. 192 to 208 also gives suitable emulsifiers. Examples of trade names of emulsifiers are Dowfax® 2 A1, Emulan® NP 50, Dextrol® OC 50, Emulgator 825, Emulgator 825 S, Emulan® OG, Texapon® NSO, Nekanil® 904 S, Lumiten® I-RA, Lumiten® E 3065, Disponil® FES 77, Lutensol®AT 18, Steinapol® VSL, Emulphor® NPS 25. For the present invention, preference is given to ionic emulsifiers or protective colloids. These are particularly preferably ionic emulsifiers, in particular salts and acids, e.g. carboxylic acids, sulfonic acids, and sulfates, sulfonates, or carboxylates. The usual amounts used of the surfactant substances are from 0.1 to 10 parts by weight, preferably from 0.2 to 5 parts by weight, based on 100 parts by weight of the monomers to be polymerized.

Examples of water-soluble initiators for the emulsion polymerization reaction are the ammonium and alkali metal salts of peroxodisulfuric acid, e.g. sodium peroxodisulfate, hydrogen peroxide, or organic peroxides, e.g. tert-butyl hydroperoxide. The systems known as reduction-oxidation (redox) initiator systems are also suitable. The redox initiator systems are composed of at least one usually inorganic reducing agent and of an inorganic or organic oxidant. The oxidation component is by way of example one of the abovementioned initiators for the emulsion polymerization reaction. The reduction component is by way of example an alkali metal salt of sulfurous acid, e.g. sodium sulfite, sodium hydrogen sulfite, or an alkali metal salt of disulfurous acid, e.g. sodium disulfite, or a bisulfite adduct of aliphatic aldehydes and ketones, e.g. acetone bisulfite, or a reducing agent such as hydroxymethanesulfinic acid and salts thereof, or ascorbic acid. The redox initiator systems can be used with concomitant use of soluble metal compounds, where the metallic component of these can occur in a plurality of valency states. Examples of usual redox initiator systems are ascorbic acid/ferrous sulfate/sodium peroxodisulfate, tert-butyl hydroperoxide/sodium disulfite, tert-butyl hydroperoxide/Na hydroxymethanesulfinic acid. The individual components, e.g. the reduction component, can also be mixtures, e.g. a mixture of the sodium salt of hydroxymethanesulfinic acid and sodium disulfite. The abovementioned compounds are mostly used in the form of aqueous solutions, where the minimum concentration is determined by the acceptable amount of water in the dispersion, and the maximum concentration is determined by the solubility of the relevant compound in water. The concentration is generally from 0.1 to 30% by weight, preferably from 0.5 to 20% by weight, particularly preferably from 1.0 to 10% by weight, based on the solution.

The amount of the initiators is generally from 0.1 to 10% by weight, preferably from 0.5 to 5% by weight, based on the monomers to be polymerized. It is also possible to use a plurality of various initiators for the emulsion polymerization reaction.

It is possible to use regulators during the polymerization reaction, and these reduce molar mass, examples of amounts of these being from 0 to 0.8 parts by weight, based on 100 parts by weight of the monomers to be polymerized. Examples of suitable compounds are those having a thiol group, e.g. tert-butyl mercaptan, thioglycolic ester, e.g. 2-ethylhexyl thioglycolate, mercaptoethynol, mercaptopropyltrimethoxysilane, n-dodecyl mercaptan, or tert-dodecyl mercaptan. Other suitable regulators are C6-C20 hydrocarbons which form a pentadienyl radical on abstraction of hydrogen, e.g. terpinols.

The emulsion polymerization reaction generally takes place at from 30 to 130° C., preferably from 50 to 90° C. The polymerization medium can be composed solely of water or else of a mixture of water and liquids miscible therewith, an example being methanol. It is preferable to use solely water.

The polymerization reaction takes place via staged polymerization, where at least one portion of the soft acrylate monomers (a) are polymerized in a first polymerization stage, and at least one portion of the hard acrylate monomers (c) are polymerized in a second or subsequent polymerization stage. It is preferable that at least 50% by weight, i.e. 50-100% by weight, in particular 100% by weight, of the total amount of the soft acrylate monomers (a) are polymerized in the first stage and that at least 10% by weight, preferably 5-60% by weight, or from 20 to 50% by weight, of the total amount of the hard acrylate monomers (c) are polymerized in the second or subsequent stage.

The individual stages of the emulsion polymerization reaction can be carried out as a batch process or else in the form of a feed process, inclusive of a gradient procedure. For the first stage, preference is given to the feed process in which a portion of the polymerization mixture is used as initial charge and heated to the polymerization temperature, and incipient polymerization thereof is carried out, and then the remainder of the polymerization mixture for the first stage is introduced, usually by way of a plurality of spatially separate feeds, of which one or more comprise(s) the monomers in pure or emulsified form, this being achieved either continuously or with use of a concentration gradient, while maintaining the polymerization reaction in the polymerization zone.

A polymer seed can also be used as initial charge in the polymerization reaction, for example to improve adjustment of particle size. The manner in which the initiator is added to the polymerization vessel during the course of the free-radical aqueous emulsion polymerization reaction is known to the person of average skill in the art. The material can either be used entirely as an initial charge to the polymerization vessel or used continuously or in stages as required by consumption thereof during the course of the free-radical aqueous emulsion polymerization reaction. The details here depend on the chemical nature of the initiator system and also on the polymerization temperature. It is preferable that a portion is used as initial charge and that the remainder is introduced as required by consumption in the polymerization zone. For removal of the residual monomers, it is also usual to add initiator after the end of the actual emulsion polymerization reaction, i.e. after conversion of the monomers has reached at least 95%. In the feed process, the individual components can be added to the reactor from above, laterally, or from below via the base of the reactor.

The emulsion polymerization reaction gives aqueous dispersions of the polymer, generally with solid contents of from 15 to 75% by weight, preferably from 40 to 75% by weight. For high space/time yield of the reactor, preference is given to dispersions with maximum solids content. To permit achievement of solids contents >60% by weight, particle size should be adjusted to be bi- or polymodal, since otherwise the viscosity becomes excessive, and the dispersion cannot then be handled. A new generation of particles can be produced by way of example by adding seed (EP 81083), by adding excess amounts of emulsifier, or by adding mini emulsions. Another advantage associated with low viscosity at high solids content is improved coating behavior at high solids contents. Production of (a) new generation(s) of particles can take place at any desired juncture. The juncture depends on the particle size distribution desired for low viscosity. The resultant polymer is preferably used in the form of an aqueous dispersion thereof.

The average particle size of the polymer particles dispersed in the aqueous dispersion is preferably smaller than 300 nm, in particular smaller than 200 nm. It is particularly preferable that the average particle size is from 140 to 200 nm. Average particle size here is the $d_{50}$ value of the particle size distribution, i.e. the particle diameter of 50% by weight of the total mass of all of the particles is smaller than the $d_{50}$ value. The particle size distribution can be determined in a known manner by using an analytical ultracentrifuge (W. Mächtle, Makromolekulare Chemie 185 (1984), pp. 1025-1039).

The pH of the polymer dispersion is preferably adjusted to pH greater than 4.5, in particular to pH from 5 to 8.

The glass transition temperature of the polymer is preferably from −60 to 0° C., particularly preferably from −60 to −10° C., and very particularly preferably from −60 to −20° C. The glass transition temperature can be determined via differential scanning calorimetry (ASTM D 3418-08, "midpoint temperature").

The adhesives of the invention are preferably pressure-sensitive adhesives. These can be composed solely of the polymer and, respectively, of the aqueous dispersion of the polymer.

The adhesive needs no external crosslinking agent. Content of external crosslinking agents is therefore generally smaller than 0.5 part by weight for every 100 parts by weight of polymer, and in particular smaller than 0.1 part by weight. It is particularly preferable to omit external crosslinking agents entirely.

The adhesives and pressure-sensitive adhesives can comprise further additives, e.g. fillers, dyes, flow control agents, thickeners or tackifiers (tackifying resins). Examples of tackifiers are natural resins, such as rosins, and the derivatives produced therefrom via disproportionation or isomerization, polymerization, dimerization, and hydrogenation. These can be used in the form of salt thereof (having, for example, mono- or polyvalent counterions (cations)), or preferably in an esterified form thereof. Alcohols used for the esterification process can be mono- or polyhydric. Examples are methanol, ethanediol, diethylene glycol, triethylene glycol, 1,2,3-propanethiol, and pentaerythritol. Hydrocarbon resins are also used as tackifiers, examples being cumarone-indene resins, polyterpene resins, hydrocarbon resins based on unsaturated CH compounds, such as butadiene, pentene, methylbutene, isoprene, piperylene, divinylmethane, pentadiene, cyclopentene, cyclopentadiene, cyclohexadiene, styrene, α-methylstyrene, and vinyltoluene. Compounds also increasingly used as tackifiers are polyacrylates of low molecular weight. The weight-average molecular weight $M_w$ of these polyacrylates is preferably below 30 000. The polyacrylates are preferably composed of at least 60% by weight, in particular at least 80% by weight, of $C_1$-$C_8$-alkyl (meth)acrylates. Preferred tackifiers are natural or chemically modified rosins. Rosins are composed mainly of abietic acid or of abietic acid derivatives. The amount by weight of the tackifiers is preferably from 5 to 100 parts by weight, particularly preferably from 10 to 50 parts by weight, based on 100 parts by weight of polymer (solids/solids).

The adhesive or pressure-sensitive adhesive is particularly suitable for the bonding of substrates characterized in that at least one of the substrate surfaces to be bonded is made of flexible PVC. By way of example, the adhesive can be applied to a substrate, e.g. made of paper or plastic, and the substrate thus coated (e.g. a label or adhesive tape, or a foil), can be adhesive-bonded to a substrate made of flexible PVC.

The adhesives or pressure-sensitive adhesives of the invention are in particular suitable for producing self-adhesive items, such as labels, adhesive tapes, or adhesive foils, e.g. protective foils. The self-adhesive items are generally composed of a substrate and of a layer of the adhesive applied mono- or bilaterally, preferably monolaterally. The substrate material can by way of example be paper, or preferably plastics foils made of polyolefins or PVC, particular preference being given to PVC, and very particular preference being given to flexible PVC. Flexible PVC is polyvinyl chloride which comprises plasticizers and which has a reduced softening point. Examples of usual plasticizers are phthalates, epoxides, and adipic esters. The plasticizer content in the flexible PVC is generally more than 10% by weight, in particular more than 20% by weight.

When flexible PVC is used, plasticizers can migrate into the adhesive layer and markedly impair the properties of the adhesive. When the adhesive of the invention is used, migration of the plasticizers has no or hardly any effect on the properties of the adhesive. Furthermore, especially when flexible PVC is used, use of the adhesive of the invention avoids or reduces shrinkage of the substrates.

The present invention therefore also provides self-adhesive items with flexible PVC as substrate material, in particular in the form of PVC foil, and with an adhesive layer coated at least to some extent thereon and made of the adhesive of the invention, where the PVC foil preferably comprises at least 20% by weight of plasticizer.

To produce the adhesive layer on the substrate material, the substrate material can be coated in the usual way. The resultant coated substrates are used by way of example as self-adhesive items, such as labels, adhesive tapes, or foils. The self-adhesive items with flexible PVC as substrate material are particularly suitable for outdoor applications. In particular, printed self-adhesive foils can be used outdoors and, for example, can be adhesive-bonded to hoardings or vehicles of any type.

The self-adhesive items of the invention have good performance characteristics, in particular good peel resistance (adhesion) and shear resistance (cohesion). The properties also remain good when flexible PVC is used as substrate material, and also remain good after prolonged heat-ageing. No, or hardly any, haze in the adhesive layer is observed to result from exposure to moisture (whitening). The adhesive layer therefore has high water resistance. Hardly any shrinkage of the self-adhesive items is observed, even when the items have exposure to high temperatures, e.g. more than 50° C.

EXAMPLES

Table 1 collates the constitutions of the copolymers E1 and E2 of the invention, and also of the comparative polymers C1, C2 and C3. The comparative polymer C1 corresponds to an example in WO 2005/100502. Comparative example C2 comprises crosslinking agent but no acrylonitrile. Comparative example C3 comprises acrylonitrile, but no crosslinking agent.

The polymers E1 and E2 were produced via staged polymerization (swelling polymerization), by copolymerizing 8 parts by weight (based on 100 parts by weight of all of the monomers) of methyl methacrylate together with the other monomers in a first polymerization stage and then postpolymerizing 4 parts by weight of methyl methacrylate in a second polymerization stage.

TABLE 1

Quantitative data in parts by weight per 100 parts by weight of all of the monomers

|  | E1 | E2 | C1 | C2 | C3 |
| --- | --- | --- | --- | --- | --- |
| EHA | 67.49 | 69.39 | 58.7 | 72.49 | 67.54 |
| Ethyl acrylate |  |  | 27 |  |  |
| Methyl methacrylate | 8 ($1^{st}$ stage) 4 ($2^{nd}$ stage) | 8 ($1^{st}$ stage) 4 ($2^{nd}$ stage) |  | 8 ($1^{st}$ stage) 4 ($2^{nd}$ stage) | 8 ($1^{st}$ stage) 4 ($2^{nd}$ stage) |
| Methyl acrylate | 7.9 | 7.9 |  | 7.9 | 7.9 |
| Acrylonitrile | 5 | 5 |  |  | 5 |
| HPA | 2.16 | 2.16 |  | 2.16 | 2.16 |
| HBA | 1.9 |  |  | 1.9 | 1.9 |
| Styrene | 2 | 2 | 5 | 2 | 2 |
| Vinyl acetate |  |  | 5 |  |  |
| Acrylic acid | 1.5 | 1.5 | 3 | 1.5 | 1.5 |
| Allyl methacrylate | 0.05 | 0.05 |  | 0.05 |  |
| Butanediol diacrylate |  |  |  | 1.3 |  |

HBA: 2-Hydroxybutyl acrylate
HPA: 2-Hydroxypropyl acrylate
EHA: 2-Ethylhexyl acrylate Aqueous polymer dispersions were obtained. Pressure-sensitive-adhesive compositions were produced from the aqueous polymer dispersions via thickening with $NH_3$, and the properties of these were tested.

Peel Resistance after Heat-ageing

Flexible PVC foil obtainable from Renolit was coated with an amount of 20 g/m$^2$ of the pressure-sensitive-adhesive compositions (for all properties other than whitening, where the amount was 25 g/m$^2$), and was dried for 3 minutes at 90° C. Peel resistance (adhesion) was then determined. The coated substrate was cut into test strips of width 25 mm. For determining peel resistance (adhesion), in each case a test strip of width 2.5 cm was adhesive-bonded to a steel test specimen and rolled once with a roller weighing 1 kg. After 20 minutes, one end of the specimen was clamped into the upper jaws of a tensile test apparatus. The adhesive strip was peeled at 300 mm/min at an angle of 180° from the test surface, i.e. the test strip was bent over and peeled parallel to the metal test plate, and the force that had to be applied to achieve this was measured. The measure used for peel strength is the force N/2.5 cm, obtained in the form of average value from five tests. Standard conditions (50% rel. humidity, 1 bar, 23° C.) were used for the test. The peel test was carried out after heat-ageing. The heat-ageing of the test composites (3 days, 70° C.) simulates accelerated ageing of the specimens and therefore simulates forced migration of the plasticizer out of the PVC substrate into the adhesive layer. Table 2 lists the results.

Whitening (Water Resistance)

The test strips were suspended in a water bath at room temperature (about 23° C.). The haze in the adhesive film was observed as a function of time. The juncture at which marked haze was discernible was determined. The longer the period, the better the water resistance. Table 2 lists the results.

TABLE 2

|    | Peel resistance after heat-ageing (N/25 mm) | Whitening |
|----|---------------------------------------------|-----------|
| E1 | 11                                          | 4 h       |
| E2 | 12.1                                        | 2 h       |
| C1 | 0.6                                         | 2 h       |
| C2 | 0.3                                         | 2 h       |
| C3 | 0.4                                         | 2 h       |

The invention claimed is:

1. An adhesive, comprising a polymer obtained by free-radical polymerization of ethylenically unsaturated compounds, the polymer comprising, in reacted form:
   (a) at least 50% by weight of at least one soft acrylate monomer that is an alkyl acrylate whose homopolymer has a glass transition temperature below 0° C.,
   (b) at least 1% by weight of at least one ethylenically unsaturated nitrile,
   (c) at least 1% by weight of at least one hard acrylate monomer selected from the group consisting of an alkyl acrylate and an alkyl methacrylate, whose respective homopolymers have a glass transition temperature of at least 60° C.,
   (d) at least 0.1% by weight of at least one ethylenically unsaturated acid monomer,
   (e) at least 0.01% by weight of at least one monomer having at least two non-conjugated, polymerizable vinyl groups, and
   (f) optionally other monomers different from the monomers (a)-(e),
   where the polymerization is performed by a staged polymerization comprising polymerizing 50-100% by weight of a total amount of the soft acrylate monomer (a) in a first polymerization stage, and polymerizing 10 to 60% by weight of a total amount of the hard acrylate monomer (c) in a second or subsequent polymerization stage.

2. The adhesive of claim 1, wherein:
   the soft acrylate monomer (a) is n-butyl acrylate, 2-ethylhexyl acrylate, or both,
   the ethylenically unsaturated nitrile (b) is acrylonitrile,
   the hard acrylate monomer (c) is methyl methacrylate,
   the acid monomer (d) is acrylic acid, methacrylic acid, or both, and
   the monomer (e) is at least one selected from the group consisting of an alkanediol diacrylate, an alkanediol dimethacrylate, an allyl acrylate and an allyl methacrylate.

3. The adhesive of claim 1, wherein the polymer comprises, in reacted form:
   55 to 90% by weight of (a),
   1 to 15% by weight of (b),
   1 to 30% by weight of (c),
   0.1 to 10% by weight of (d),
   0.05 to 0.5% by weight of e, and
   0.5 to 25% by weight of (f).

4. The adhesive of claim 1, wherein the polymer comprises 0.5 to 15% by weight of at least one hydroxymonomer selected from the group consisting of a hydroxyalkyl acrylate and a hydroxyalkyl methacrylate having respectively from 1 to 10 carbon atoms in the alkyl group.

5. The adhesive of claim 1, wherein the polymer comprises, in reacted form:
   (a) 55 to 90% by weight of at least one soft acrylate monomer selected from n-butyl acrylate and 2-ethylhexyl acrylate,
   (b) 2 to 10% by weight of acrylonitrile,
   (c) 1 to 30% by weight of methyl methacrylate, where 1 to 15% by weight, based on a total amount of all of the monomers, are polymerized in the second polymerization stage,
   (d) 0.2 to 5% by weight of at least one acid monomer selected from acrylic acid and methacrylic acid,
   (e) 0.05 to 0.5% by weight of at least one monomer having at least two non-conjugated, polymerizable vinyl groups,
   (f1) 0.5 to 10% by weight of at least one hydroxymonomer selected from the group consisting of a hydroxyalkyl acrylate and a hydroxyalkyl methacrylate having respectively from 1 to 10 carbon atoms in the alkyl group, and
   (f2) 0 to 15% by weight of other monomers different from the monomers (a) to (f1).

6. The adhesive of claim 1, wherein the polymer comprises no vinyl acetate and no crosslinking agents other than monomers (e).

7. The adhesive of claim 1, wherein the polymer is an emulsion polymer.

8. The adhesive of claim 1, which is a pressure-sensitive adhesive.

9. The adhesive of claim 1, wherein the soft acrylate monomer (a) is an alkyl acrylate whose homopolymer has a glass transition temperature below −10° C.

10. The adhesive of claim 1, wherein the soft acrylate monomer (a) is an alkyl acrylate whose homopolymer has a glass transition temperature below −20° C.

11. The adhesive of claim 1, wherein the soft acrylate monomer (a) is an alkyl acrylate whose homopolymer has a glass transition temperature below −30° C.

12. The adhesive of claim 1, wherein the hard acrylate monomer (c) is at least one selected from the group consisting of an alkyl acrylate and an alkyl methacrylate, whose respective homopolymers have a glass transition temperature of at least 80° C.

13. The adhesive of claim 1, wherein the ethylenically unsaturated acid monomer (d) is acrylic acid.

14. The adhesive of claim 1, wherein the monomer having at least two non-conjugated, polymerizable vinyl groups (e) is at least one selected from the group consisting of allyl methacrylate, butanediol diacrylate, butanediol dimethacrylate, hexanediol diacrylate, and hexanediol dimethacrylate.

15. The adhesive of claim 1, comprising polymerizing 20 to 50% by weight of a total amount of said hard acrylate monomer (c) in said second or subsequent polymerization stage.

16. The adhesive of claim 5, wherein the hydroxymonomer (f1) is at least one selected from the group consisting of 2-hydroxypropyl acrylate and 2-hydroxybutyl acrylate.

17. The adhesive of claim 5, wherein the polymer comprises, in reacted form, monomer (f2) different from the monomers (a) to (f1), wherein the monomer (f2) is styrene.

18. A self-adhesive item comprising a substrate material comprising a PVC foil with plasticizer content of at least 20% by weight, where the PVC foil has been coated with the adhesive of claim 1.

19. A method of bonding two substrates, at least one of which comprises flexible PVC, the method comprising contacting the adhesive of claim 1 to the two substrates.

20. The method of claim 19, wherein the adhesive is a pressure-sensitive adhesive.

* * * * *